(12) United States Patent
Yamaguchi et al.

(10) Patent No.: US 10,630,223 B2
(45) Date of Patent: Apr. 21, 2020

(54) POWER TOOL

(71) Applicant: Koki Holdings Co., Ltd., Tokyo (JP)

(72) Inventors: Satoshi Yamaguchi, Hitachinaka (JP);
Yoshikazu Kawano, Hitachinaka (JP);
Kazuhiko Funabashi, Hitachinaka (JP)

(73) Assignee: Koki Holdings Co., Ltd., Tokyo (JP)

( * ) Notice: Subject to any disclaimer, the term of this patent is extended or adjusted under 35 U.S.C. 154(b) by 0 days.

(21) Appl. No.: 16/067,049

(22) PCT Filed: Nov. 25, 2016

(86) PCT No.: PCT/JP2016/084954
§ 371 (c)(1),
(2) Date: Jun. 28, 2018

(87) PCT Pub. No.: WO2017/115594
PCT Pub. Date: Jul. 6, 2017

(65) Prior Publication Data
US 2019/0013762 A1 Jan. 10, 2019

(30) Foreign Application Priority Data
Dec. 28, 2015 (JP) ................................. 2015-257446

(51) Int. Cl.
| H02P 29/00 | (2016.01) |
| B25F 5/00 | (2006.01) |
| B24B 23/02 | (2006.01) |
| B25F 5/02 | (2006.01) |
| H02P 29/024 | (2016.01) |
| B23D 45/16 | (2006.01) |
| B27G 19/04 | (2006.01) |
| B24B 47/12 | (2006.01) |

(52) U.S. Cl.
CPC .......... *H02P 29/0022* (2013.01); *B24B 23/02* (2013.01); *B25F 5/00* (2013.01); *B25F 5/02* (2013.01); *H02P 29/027* (2013.01); *B23D 45/16* (2013.01); *B24B 47/12* (2013.01); *B27G 19/04* (2013.01)

(58) Field of Classification Search
CPC ...... H02P 1/00; H02P 1/12; H02P 1/18; H02P 1/24; H02P 1/26; H02P 1/265; H02P 1/42; H02P 1/46; H02P 1/465; H02P 3/00; H02P 3/025; H02P 3/04; H02P 3/12; H02P 3/14; H02P 3/16; H02P 3/22; H02P 3/26; H02P 6/00; H02P 6/14; H02P 6/24; H02P 7/00; H02P 23/00; H02P 27/00; H02P 25/14
USPC .......... 318/400.01, 700, 701, 721, 727, 799, 318/362, 741, 742, 757, 759, 370, 371, 318/372, 375, 376
See application file for complete search history.

(56) References Cited

U.S. PATENT DOCUMENTS

| 5,063,319 A * | 11/1991 | Mason | B23D 47/12 310/158 |
| 5,444,318 A * | 8/1995 | Stumpf | H02K 7/106 310/103 |
| 5,677,586 A * | 10/1997 | Horst | H02K 23/02 310/103 |
| 6,037,729 A * | 3/2000 | Woods | B27B 5/38 318/245 |
| 6,094,025 A * | 7/2000 | Rosa | H02P 3/12 318/245 |
| 6,680,596 B1 * | 1/2004 | DeCicco | H01R 39/42 318/376 |
| 6,998,804 B2 * | 2/2006 | Meyer | H02P 3/06 318/362 |
| 7,023,159 B2 * | 4/2006 | Gorti | H02P 3/12 318/139 |
| 2005/0245183 A1 * | 11/2005 | Deshpande | B24B 23/03 451/357 |
| 2011/0078910 A1 | 4/2011 | Tomita et al. | |
| 2012/0279743 A1 * | 11/2012 | Suda | B25F 5/001 173/176 |
| 2015/0340974 A1 * | 11/2015 | Usselman | H02P 3/22 318/245 |

FOREIGN PATENT DOCUMENTS

| GB | 2485276 A | 5/2012 |
| JP | 61-159176 U | 10/1986 |
| JP | 62-014991 U | 1/1987 |
| JP | 03-212118 A | 9/1991 |

(Continued)

OTHER PUBLICATIONS

Japan Patent Office Notification of Reasons of Refusal for patent application JP2017-558891 (dated Apr. 1, 2019), 11 pages with translation.
International Report on Patentability for application PCT/JP2016/084954 (dated Jul. 3, 2018), 9 pages.
International Search Report for international application PCT/JP2016/084954 (dated Feb. 14, 2017) 11 pages with translation.
Japan Patent Office Office Action for patent application JP2017-558891 (dated Aug. 1, 2019), 12 pages with translation.
European Patent Office Extended Search for EP16881574.4 dated Aug. 28, 2019, 7 pages.

*Primary Examiner* — Antony M Paul
(74) *Attorney, Agent, or Firm* — Kilpatrick Townsend & Stockton LLP (57) ABSTRACT

A power tool which brakes a motor without turning off a trigger switch when a trouble occurs in the motor is provided. The power tool (10) comprises: a motor (20) that rotates by supply of electricity from a power source (PS); a controller (38) for controlling the rotation of the motor; a switch (12) for switching on and off of power supply from the power source to the motor manually; first braking means (23) for braking the motor when the switch (12) is switched from on to off; and second braking means (23, 45) for braking the motor (20) on the basis of a prescribed signal from the controller when the switch (12) is in an on state.

10 Claims, 6 Drawing Sheets

(56) References Cited

FOREIGN PATENT DOCUMENTS

| | | |
|---|---|---|
| JP | 05-192027 A | 8/1993 |
| JP | 11-215871 A | 8/1999 |
| JP | 2002-027770 A | 1/2002 |
| JP | 2011-079075 A | 4/2011 |
| JP | 2013-192512 A | 9/2013 |
| JP | 2014-069301 A | 4/2014 |
| WO | WO99/63643 A1 | 12/1999 |

* cited by examiner

// POWER TOOL

TECHNICAL FIELD

This invention relates to a power tool.

BACKGROUND

Power tools, such as electric circular saws and grinders, are required to brake their motors and quickly stop their end bits for workability when their trigger switches are turned off.

Figure 1:
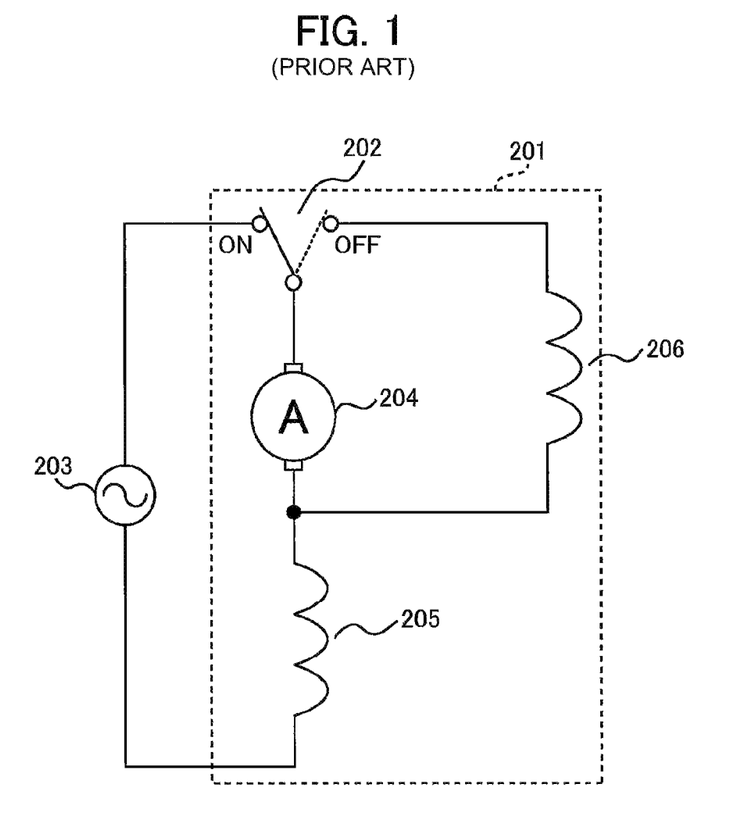
FIG. 1 A circuit diagram of a conventional power tool.

As illustrated in FIG. 1, in a conventional power tool 201, when a trigger switch 202 is turned on, a power supply 203 forms a closed circuit together with an armature 204 and a field coil 205 to rotate the armature 204 to move an end bit. The armature 204 and the field coil 205 constitute a motor. When the trigger switch 202 is turned off, the armature 204 is disconnected from the power supply 203, and forms another closed circuit together with a brake coil 206. In this time, the current which flows in the brake coil 206 brakes the rotation of the armature 204, and stops the end bit.

CITATION LIST

Patent Literature

Patent Literature 1: Japanese Patent Application Publication 2002-27770

SUMMARY OF INVENTION

Technical Problem

When a workpiece is being cut with a disk grinder or an electric circular saw, an end bit may bite into the workpiece, rapidly increasing torque of the motor. In this case, reaction force against the torque may act on the power tool, possibly causing kickback. Because the kickback may damage the workpiece, the power tool is required to be immediately stopped by braking the motor. In addition to the kickback, the power tool is also required to be immediately stopped when overcurrent flows in the motor.

In the power tool of FIG. 1, however, the trigger switch 202 must be turned off to brake the motor. Thus, it is difficult to brake the motor when the trigger switch 202 remains in its ON state.

In view of the above-described problem, an object of the present invention is to provide a power tool which can stop the motor even when the trigger switch is in its ON state.

Solution to Problem

The present invention provides a power tool comprising: a motor accommodated in a housing, the motor rotating with electric power supplied from a power source; a controller for controlling rotation of the motor; a switch configured to be manually switched between on and off of power supply from the power source to motor; first braking means for braking the motor when the switch is switched from on to off; and second braking means for braking the motor on the basis of a predetermined signal from the controller when the switch is in an on state.

With the above structure, during an operation of the power tool, when the motor needs to be urgently stopped due to an accident such as occurrence of kickback, the second braking means blocks power supply from power source to the motor on the basis of a signal from the controller to brake the motor. Thus, the driving of the power tool is rapidly stopped so that unexpected damage to a workpiece can be avoided. Further, when the controller detects that the work to the workpiece is over, the controller brakes the motor before turning off of the trigger switch, to stop the driving of the power tool.

Preferably, the second braking means stops the power supply from the power source to the motor. With this structure, the power is not supplied from the power source to the motor, so that the motor is quickly braked and the driving of the power tool is stopped.

Preferably, the predetermined signal is a signal generated by the controller when the controller detects a change more than a prescription related to the motor.

Preferably, the change more than the prescription is at least one of number-of-rotations, a current value, and a position. Accordingly, the controller responds to the change more than the prescription to brake the motor. As a result, the operation of the power tool can be quickly stopped without turning off the switch.

Preferably, the power tool further comprises: a control circuit including the controller, wherein the first braking means comprises a first closed circuit formed when the switch is switched. The second braking means comprises a second closed circuit generated by the controller. The first closed circuit and the second closed circuit are provided at the control circuit.

When the switch is turned off to form the first closed circuit, the current flowing the closed circuit generates a braking force for the motor, thereby braking the motor. The power tool is then stopped. On the other hands, when the second closed circuit is formed, the current flowing the closed circuit generates a braking force for the motor without turning off the switch. Accordingly, the motor is braked and the operation of the power tool is stopped.

Preferably, the second closed circuit comprises a switching element to be switched on by means of the predetermined signal.

Preferably, the first closed circuit comprises a brake coil, the first closed circuit being configured to brake the motor. With the above structure, the coil current flowing the brake coil generates a braking force for the motor, so that the motor is braked. Accordingly, the operation of the power tool is stopped without turning off the switch.

Preferably, the motor is a brushed motor. When the controller detects a change more than a prescription related to the motor, the second braking means brakes the motor even if the switch is in the on state. Accordingly, the power tool is rapidly stopped.

Preferably, the second braking means uses the brake coil of the first braking means to brake the motor. The first braking means and the second braking means share the brake coil. Accordingly, the power tool is formed compact and light.

Preferably, the motor is a brushless motor. When the controller detects a change more than a prescription related to the motor, the second braking means brakes the motor even if the switch is in an on state. Accordingly, the power tool is rapidly stopped.

Advantageous Effects of Invention

The present invention exhibits advantageous effects as follows. Two braking means are provided for a motor. Even if a switch cannot be turned off, the motor is reliably braked. Accordingly, the power tool can be quickly stopped.

DESCRIPTION OF EMBODIMENTS

Hereinafter, some embodiments of the present invention will be described with reference to the accompanying drawings.

Figure 2:
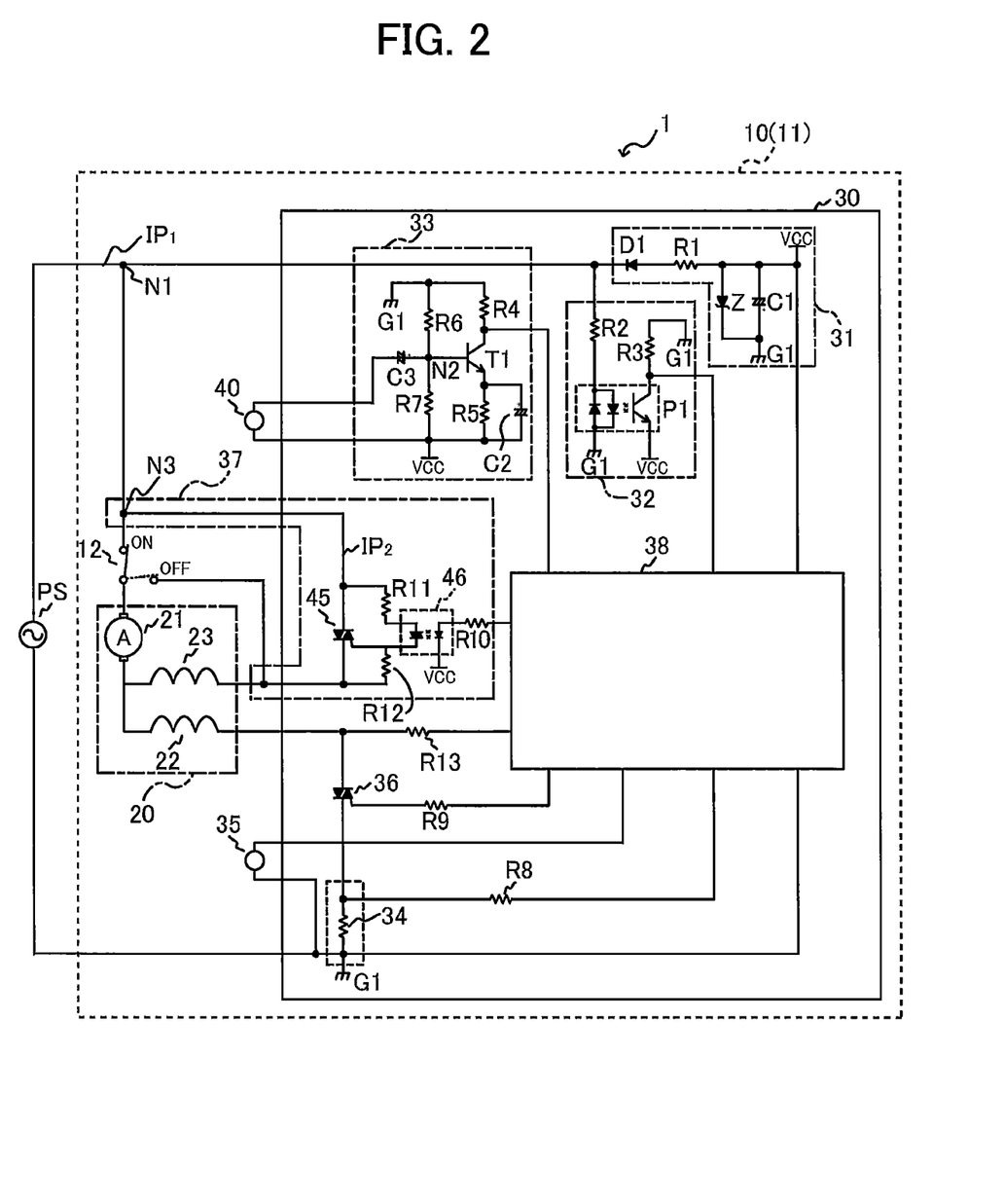
FIG. 2 A circuit diagram of a power tool of the first embodiment according to the present invention.

A power tool 1 of a first embodiment of the present invention accommodates a driving circuit 11 including a motor 20 illustrated in FIG. 2 in a housing 10. The driving circuit 11 includes a control circuit 30 which controls the motor 20. An end bit is joined to the rotation shaft of the motor 20, and is driven by the rotation of the motor 20.

The motor 20 is driven by a power supply PS which is a commercial power supply to supply alternating-current power. The motor 20 is connected in series with a trigger switch 12 to provide a first current path $IP_1$ together with the trigger switch 12.

The motor 20 is a brushed motor, and includes an armature 21, a field coil 22, and a brake coil 23. The armature 21 is provided with the rotation shaft of the motor 20. The armature 21 is referred to also as a rotor. The field coil 22 is connected in series with the armature 21, and included in the first current path $IP_1$. The armature 21 is rotated by magnetic flux generated by the current which flows in the field coil 22. The brake coil 23 is connected in series with the armature 21. The rotation of the armature 21 is braked by magnetic flux generated by the current which flows in the brake coil 23. It is noted that the field coil 22 and the brake coil 23 are not simultaneously electrically-connected to the armature 21. The brake coil 23 is one part of the first braking means.

The trigger switch 12 is a mechanical switch which has an ON contact ("ON" of FIG. 2) and an OFF contact ("OFF" of FIG. 2). One of those contacts can be selected and connected to the motor 20 by the operator who manually turns on or off the trigger switch 12. When the trigger switch 12 is in an ON state (the ON contact is selected), the motor 20 is connected to the power supply PS through the trigger switch 12. When the trigger switch 12 is in an OFF state (the OFF contact is selected), the motor 20 is disconnected from the power supply PS by the trigger switch 12. The ON contact of the trigger switch 12 is connected to the first current path $IP_1$, and the OFF contact is connected to a second current path $IP_2$ described later. The trigger switch 12 is one example of the switch.

The control circuit 30 includes a control power-supply circuit 31, a zero-crossing detection circuit 32, a number-of-rotations detection circuit 33 for detecting the number of rotations of the motor 20, a current detection circuit 34 for detecting the motor current, an acceleration sensor 35, a first switching element 36, a brake control circuit 37, and a microcomputer 38. The microcomputer 38 is one example of the controller.

The control power-supply circuit 31 is a half-wave rectifying circuit including a zener diode Z, a resistor R1, a diode D1, and a capacitor C1. The cathode of the zener diode Z is connected to a first potential G1; and the anode of the zener diode Z is connected to an output terminal and to the anode of the diode D1 through the resistor R1. The cathode of the diode D1 is connected to a node N1 of the first current path IP. The capacitor C1 is connected in parallel with the zener diode Z. The zener diode Z generates a reference voltage Vcc at the output terminal, when a voltage equal to or larger than a breakdown voltage thereof is applied between the anode and the cathode. The reference voltage Vcc is supplied to the microcomputer via the output terminal.

The zero-crossing detection circuit 32 includes resistors R2 and R3, and a photocoupler P1. In the zero-crossing detection circuit 32, the resistor R2 and a light emitter of the photocoupler P1 are connected in series between the node N1 of the first current path $IP_1$ and the first potential G1 in the input side. The resistor R3 and a light receiver of the photocoupler P1 are connected in series between the first potential G1 and the reference voltage Vcc in the output side. The zero-crossing detection circuit 32 detects a zero-crossing of the alternating-current voltage to output a resulting signal to the microcomputer 38.

The number-of-rotations detection circuit 33 includes a number-of-rotations sensor 40 for detecting the number of rotations of the motor 20, and an alternating-current amplification circuit 41 for amplifying the output from the number-of-rotations sensor 40. The alternating-current amplification circuit 41 includes resistors R4, R5, R6, and R7, and capacitors C2 and C3. In the alternating-current amplification circuit 41, the resistor R4, a transistor T1, and the resistor R5 are connected in series in this order between the first potential G1 and the reference voltage Vcc. The collector of the transistor T1 is connected to the resistor R4, and the emitter of the transistor T1 is connected to the resistor R5. The capacitor C2 is connected in parallel with the resistor R5. The resistors R6 and R7 are connected in series between the first potential G1 and the reference voltage Vcc. A node N2 which connects the resistor R6 with the resistor R7 is connected to the base of the transistor T1. One terminal of the number-of-rotations sensor 40 is connected to the reference voltage Vcc, and the other terminal of the number-of-rotations sensor 40 is connected to the base of the transistor T1 through the capacitor C3 and the node N2. With the above-described configuration, the number-of-rotations detection circuit 33 amplifies the output signal from the number-of-rotations sensor 40 in a range of 0 to Vcc to output a resulting signal to the microcomputer 38.

The current detection circuit 34 includes a shunt resistor connected in series with the first current path $IP_1$, and detects the motor current which flows in the motor 20. The output signal from the current detection circuit 34 is send to the microcomputer 38 via a resistor R8.

The acceleration sensor 35 detects a positional change of the power tool 1. For example, when the power tool 1 falls, the acceleration sensor 35 detects the gravitational acceleration to output a resulting signal to the microcomputer 38.

The first switching element 36 is a triac, and is connected in series with the first current path $IP_1$ to switch the first current path $IP_1$ between an ON state (energized state) and an OFF state (non-energized state). The first switching element 36 is switched to the ON state (energized state) by a gate signal which is outputted from the microcomputer 38 to the gate terminal of the triac via a resistor R9. The conduction angle of the triac is controlled by the timing at which the gate signal is received, and thus the phase control is performed for the rotation of the motor.

The brake control circuit 37 includes a second switching element 45 and a phototriac 46. The second switching element 45 is a triac; and is connected with a node N3 and the brake coil in series between the node N3 and the brake coil. The node N3 is positioned between the power supply PS and the trigger switch 12. When the second switching element 45 is turned on, the second switching element 45 serially connects the trigger switch 12 which is in the ON state, with the armature 21 of the motor 20 and the brake coil 23 to form a braking current path for the motor 20 as a second current path $IP_2$. The closed circuit formed in this time, that is, the closed circuit formed by the ON contact, the second switching element 45, the brake coil 23, and the armature 21 is one example of the second closed circuit of the present invention.

The input portion of the phototriac 46 is connected in series with a resistor R10 between an output terminal of the microcomputer 38 and the reference voltage Vcc. The output portion of the phototriac 46 has one terminal and the other terminal. The one terminal is connected to the resistor R12, and the other terminal is connected to the resistor R11, so that the phototriac 46 is connected in parallel with the second switching element 45. The one terminal of the output portion is connected to the gate terminal of the triac to turn on or off the second switching element 45. The brake control circuit 37 is one part of the second braking means.

The microcomputer 38 is supplied with electric power from the control power-supply circuit 31 to adjust the conduction angle of the first switching element 36 on the basis of an output signal from the zero-crossing detection circuit 32, the number-of-rotations detection circuit 33, the current detection circuit 34, or the acceleration sensor 35, to control the rotation of the motor 20. When the microcomputer 38 detects a change of the motor 20 which is equal to or larger than a predetermined amount, the microcomputer 38 causes the brake control circuit 37 to brake the rotation of the motor 20 to stop the end bit. Examples of the change of the motor 20 which is equal to or larger than a predetermined amount include abrupt change in the number of rotations of the armature 21 caused when the end bit bites into a workpiece (immediately before kickback occurs); overcurrent to the motor 20 caused by a load change of a workpiece; and an amount of movement of the power tool 1 including the motor 20, which is equal to or larger than a predetermined amount of movement when kickback occurs or the power tool 1 falls.

In addition, the microcomputer 38 is connected to one end portion of the field coil 22 via a resistor R13 to detect ON or OFF of the trigger switch 12. The microcomputer 38 is one example of the controller.

Next, an operation of the circuit illustrated in FIG. 2 will be described.

When the alternating-current power is supplied from the power supply PS, the reference voltage Vcc is applied from the control power-supply circuit 31 to the microcomputer 38 and predetermined portions of the control circuit 30.

When the trigger switch 12 is turned on by an operator, a switch-on signal is sent to the microcomputer 38 via the resistor R13. The microcomputer 38 then outputs the gate signal to the gate terminal of the first switching element 36 to turn on the first switching element 36. With this operation, the first current path $IP_1$ is energized, and the current starts flowing in the armature 21 and the field coil 22 in the motor 20. Then the magnetic flux generated by the field coil 22 causes the armature 21 to be rotated, thereby activating the motor 20. The microcomputer 38 then periodically supplies ON signals which turn on the first switching element 36 in synchronization with the power supply voltage, to the first switching element 36.

Then the microcomputer 38 gradually increases the conduction angle of the first switching element 36 by changing the timing at which the gate signal is outputted to the first switching element 36 from a zero-cross point of the alternating-current power detected by the zero-crossing detection circuit 32. The microcomputer 38 then controls the armature 21 so that the number of rotations of the armature 21 may become a target number of rotations. In addition, the microcomputer 38 monitors the number of rotations of the armature 21 which is detected by the number-of-rotations detection circuit 33. When the number of rotations of the armature 21 is smaller than the target number of rotations, the microcomputer 38 increases the conduction angle of the first switching element 36. On the other hands, when the number of rotations of the armature 21 is larger than the target number of rotations, the microcomputer 38 decreases the conduction angle of the first switching element 36. Thus, the microcomputer 38 controls the timing at which the gate signal is outputted with respect to a zero-crossing to performs the phase control. And, the microcomputer 38 performs the constant-number-of-rotations control so that the number of rotations of the armature 21 is always maintained constant (Step S2).

In the normal operation, an operator turns off the trigger switch 12 (connects the armature 21 to the OFF contact) when finishing his/her work. At this time, a closed circuit including the OFF contact, the brake coil 23, and the armature 21 is formed in the driving circuit 11. The closed circuit formed at this time is one example of the first closed circuit of the present invention. When the trigger switch 12 is turned from on to off to form the first closed circuit, while breaking the current which flows from the power supply PS to the armature 21, the change in magnetic flux produced with the rotation of the armature 21 causes current to flow in the brake coil 23. The current produces the effect of so-called generation (regeneration) brake, which exerts a braking force on the armature 21. A series of flow of operations performed after the trigger switch 12 is turned from on to off is one example of the flow of operations of the first braking means of the present invention. That is, the first braking means exerts the braking force on the armature 21 through the mechanical operation. The first closed circuit is one part of the first braking means.

Figure 3:
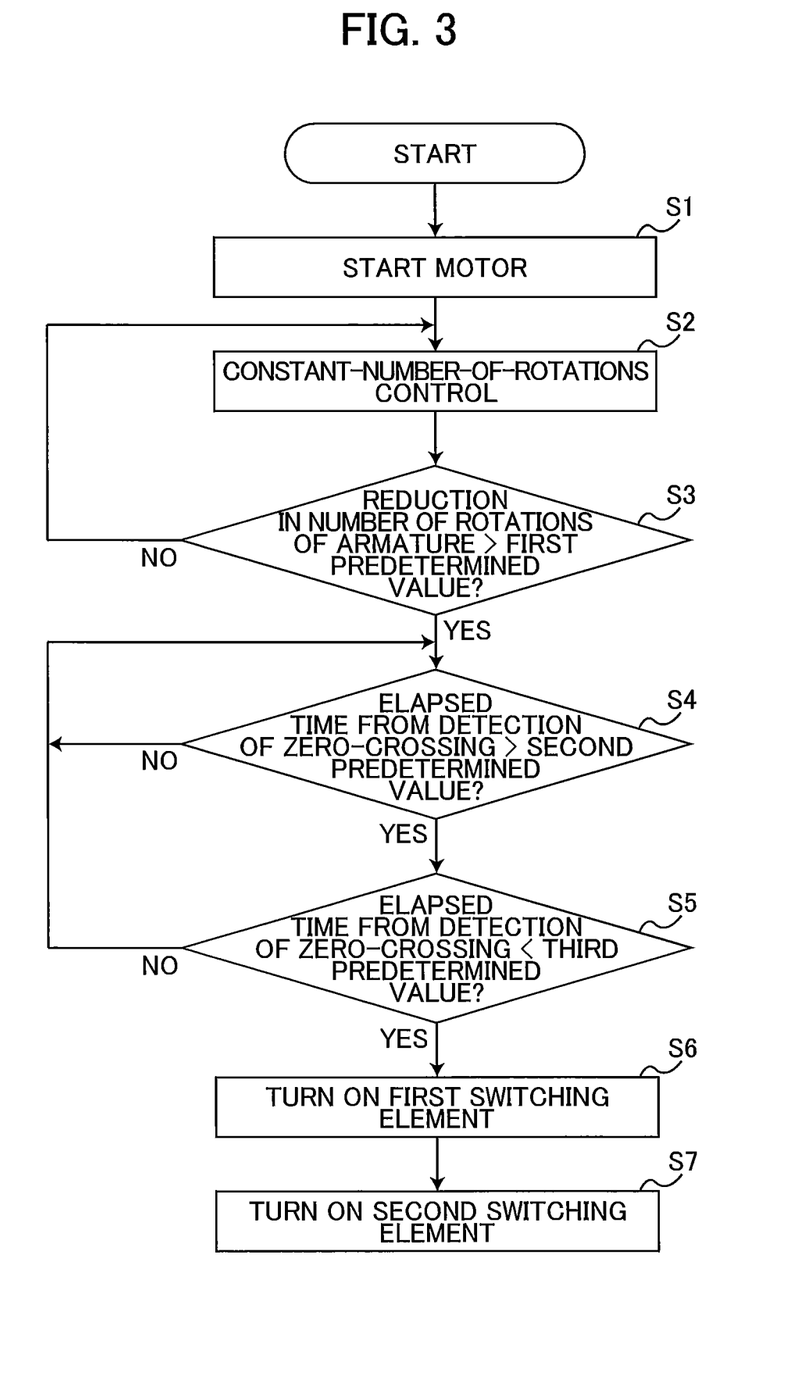
FIG. 3 A flowchart illustrating an operation of the power tool shown in FIG. 2.

Next, the braking of the motor 20 performed in the ON state of the trigger switch 12 will be described with reference to FIG. 3. When an operator turns on the trigger switch 12, the motor 20 is started as in the normal operation (Step S1). The microcomputer 38 then performs the phase control to perform the constant-number-of-rotations control so that the number of rotations of the armature 21 is always maintained constant (Step S2). The microcomputer 38 then compares the amount of reduction per unit time of the number of rotations of the armature with a first predetermined value to determine whether kickback has occurred (Step S3). The first predetermined value is the value corresponding to a change in the number of rotations of the armature only when kickback has occurred. Thus, the first predetermined value is not exceeded in normal operations.

In Step S3, if the amount of reduction per unit time of the number of rotations of the armature 21 is larger than the first predetermined value, then the microcomputer 38 determines that kickback has occurred or may occur (Step S3: YES), sets a predetermined-change detection flag to 1 to proceed to Step S4. On the other hand, if the amount of reduction per unit time of the number of rotations of the armature 21 is smaller than the first predetermined value, then the microcomputer 38 returns to Step S2, performs the constant-number-of-rotations control to monitor whether kickback has occurred.

In Step S4, after a predetermined-change flag is changed to 1, the microcomputer 38 determines whether an elapsed time from the first zero-crossing is longer than a second predetermined value (Step S4). The second predetermined value corresponds to a minimum time interval from the zero-crossing to a timing at which the first switching element 36 can be turned on in response to the gate signal.

In Step S4, if the elapsed time from the zero-crossing is longer than the second predetermined value (Step S4: YES), then the microcomputer 38 proceeds to Step S5. In Step S5, the microcomputer 38 determines whether the elapsed time is smaller than a third predetermined value. To reliably stop the motor 20 in a short time, the third predetermined value is set to a value shorter than a time interval between adjacent zero-crossings, that is, a value shorter than the half period of the alternating-current voltage.

In Step S5, if the elapsed time is shorter than the third predetermined value (Step S5: YES), then the microcomputer 38 proceeds to Step S6. In Step S6, the microcomputer 38 outputs the gate signal to the first switching element 36 to turn on the first switching element 36. When the first switching element 36 is turned on, a voltage is applied across the second switching element 45.

Then, in Step S6, the microcomputer 38 outputs a gate signal to the second switching element 45 via the phototriac 46 to turn on the second switching element 45. When the second switching element 45 is turned on, a closed circuit is formed by the trigger switch 12 which is in the ON state (the ON contact), the armature 21, the brake coil 23, and the second switching element 45. The closed circuit formed at this time is one example of the second closed circuit of the present invention. In the closed circuit, the magnetic flux generated by the current which flows in the brake coil 23 is added to the magnetic flux generated by the current which flows in the armature 21; and a braking force is generated in a direction opposite to the rotational direction of the armature 21, based on the current which flows in the brake coil 23. This braking force brakes the rotation of the armature 21 to immediately stops the armature 21, and thus stops the motor 20 and the power tool 1 (Step S8). A series of flow of operations performed from when the microcomputer 38 outputs the gate signal to the first switching element 36 to form the second closed circuit until when the braking force is exerted on the armature 21 is one example of the second braking means of the present invention. That is, the second braking means exerts the braking force on the armature 21 through the electronic control. The second closed circuit is one part of the second braking means.

The detection of kickback in Step S3 may be performed by using the acceleration sensor 35 to detect an acceleration of the housing 10 of the power tool including the motor 20, and compare the detected acceleration with a predetermined acceleration which corresponds to a kickback, in addition to comparing the amount of reduction per unit time of the number of rotations of the armature with the first predetermined value. In addition, the microcomputer 38 may detect overload or overcurrent to the motor 20 based on the motor current which is detected by the current detection circuit 34 to flow a current in the brake coil 23 in the second current path $IP_2$ for braking the rotation of the armature 21.

Figure 4:
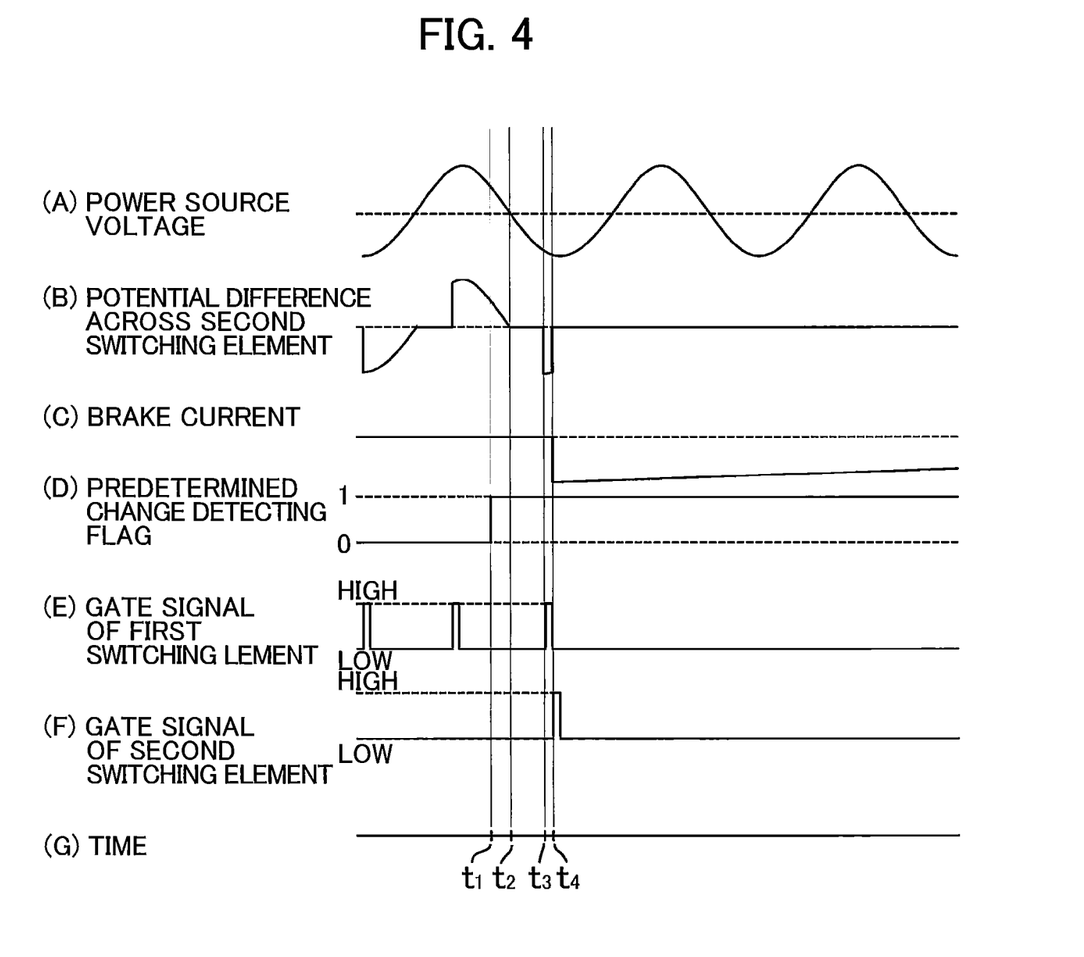
FIG. 4 Waveform diagrams for controlling the power tool shown in FIG. 2.

Next, an operation of the power tool 1 will be described with reference to FIG. 4.

When an operator turns on the trigger switch 12, the microcomputer 38 turns on the first switching element 36 to start the motor 20. At this time, the microcomputer 38 performs the phase control for the first switching element 36 with respect to the alternating-current voltage applied to the motor 20, so that the armature 21 of the motor 20 rotates at the target number of rotations (in Step S1 and S2, see FIGS. 4(a) and 4(e)).

When the microcomputer 38 detects kickback at a time $t_1$ (Step S3: YES), the microcomputer 38 changes the predetermined-change detection flag from 0 to 1 (see FIG. 4(d)). After the time $t_1$ at which the predetermined-change detection flag is set to 1, the microcomputer 38 detects the first zero-crossing of the alternating-current power at a time $t_2$, to determine an elapsed time from the time $t_2$, in Step S4 and S5. When the microcomputer 38 determines at a time $t_3$ that the elapsed time from the zero-crossing is longer than the second predetermined value and shorter than the third predetermined value, the microcomputer 38 applies the gate signal to the first switching element 36 to turn on the first switching element 36 (see FIG. 4(e)). At this time, the second switching element is also applied with a voltage illustrated in FIG. 4(b). Then, at a time $t_4$, the microcomputer 38 outputs the gate signal to the second switching element to turn on the second switching element (FIG. 4(b)). With this operation, a current flows in the second current path $IP_2$, so that a current (braking current) flows in the brake coil 23 (see FIG. 4(c)). When the current flows in the brake coil 23, the force that brakes the rotation of the armature 21 is produced, and the rotation of the motor 20 is stopped.

After the time $t_4$, the microcomputer 38, which has detected the kickback, stops the application of the gate signal to the first switching element 36. With this operation, the first current path $IP_1$ is disconnected from the power supply PS. In contrast, the braking current continuously flows in the second current path $IP_2$ while the resistance component of the second current path $IP_2$ causes loss. As a result, the braking force continuously exerts on the armature 21, and reliably stops the rotation of the armature 21.

In this manner, when kickback occurs, even if an operator cannot turn off the trigger switch 12 and the trigger switch 12 is in the ON state, the current is caused to be flown in the brake coil 23 to reliably and quickly brake the rotation of the motor 20. Thus, the power tool 1 can be stopped.

In addition to occurrence of the kickback, also when the microcomputer 38 detects overcurrent to the motor or falling of the housing 10, the microcomputer 38 can brake the rotation of the motor 20 to stop the power tool 1 without turning off the trigger switch 12. That is, when the microcomputer 38 detects a change in condition of the power tool 1 (such as the number of rotations, current value, or position) which is larger than a predetermined change, the microcomputer 38 can quickly brake the motor 20.

Furthermore, in any case of which the trigger switch 12 is in the OFF state, or the second switching element 45 is in the ON state by the brake control circuit 37, the microcomputer 38 can flow the current in the brake coil 23 to stop the rotation of the armature 21. In this configuration, because the first braking means and the second braking means share the brake coil 23, the circuit of the power tool 1 can be manufactured in a small size and inexpensively.

Next, a power tool 2 of a second embodiment according to the present invention will be described with reference to FIG. 5.

Figure 5:
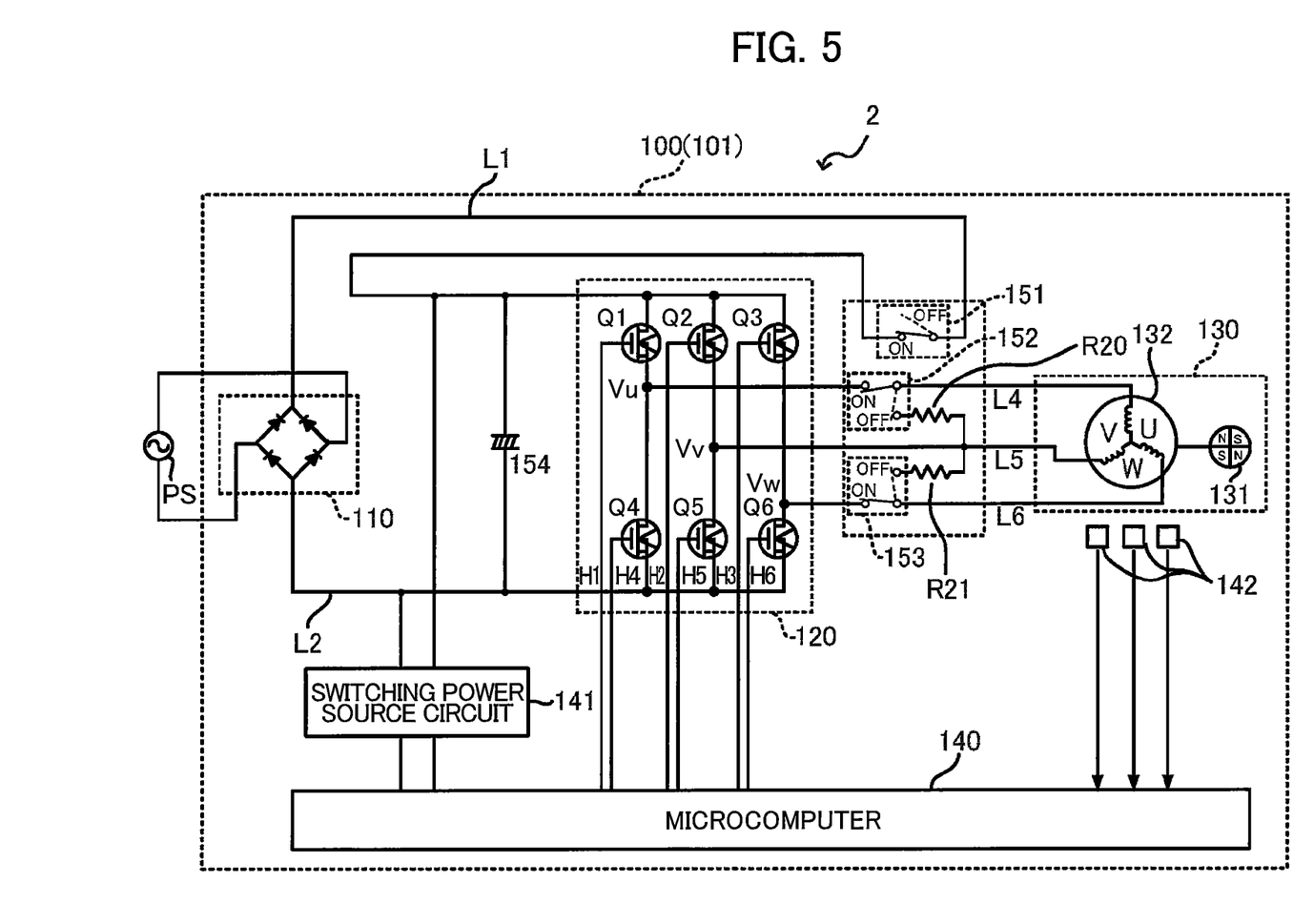
FIG. 5 A circuit diagram of a power tool of the second embodiment according to the present invention.

As illustrated in FIG. 5, a driving circuit 101 is provided in a housing 100, and is supplied with alternating-current electric power from the commercial power supply PS. The driving circuit 101 includes a rectifying circuit 110, an inverter circuit 120, a brushless motor 130, and a microcomputer 140 to control the driving of the brushless motor 130.

The rectifying circuit 110 includes a diode bridge to rectify the alternating-current electric power. The rectifying circuit 10 has two output lines: a line L1 having a high potential and a line L2 having a low potential.

The brushless motor 130 includes a rotor 131 having a permanent magnet, and a stator 132. The stator 132 has a U-phase winding, a V-phase winding, and a W-phase winding which are star-connected to each other. The brushless motor 130 is one example of the motor.

The high-potential line L1 between the rectifying circuit 110 and the inverter circuit 120 is provided with a trigger switch 151. The trigger switch 151 can be switched by an operator, and is turned on or off to feed or not feed electric power to the brushless motor 130. In addition, a capacitor 154 is provided between the rectifying circuit 110 and the inverter circuit 120.

The inverter circuit 120 includes six switching elements Q1 to Q6. The first switching element Q1, the second switching element Q2, and the third switching element Q3 are disposed on the high-potential line L1 side. The fourth switching element Q4, the fifth switching element Q5, and the sixth switching element Q6 are disposed on the low-potential line L2 side. Between the high-potential line L1 and the low-potential line L2, the first switching element Q1 and the fourth switching element Q4 are connected in series with each other, the second switching element Q2 and the fifth switching element Q5 are connected in series with each other, and the third switching element Q3 and the sixth switching element Q6 are connected in series with each other.

A node Vu between the first switching element Q1 and the fourth switching element Q4 is connected to the U-phase winding via a first line L4. A node Vv between the second switching element Q2 and the fifth switching element Q5 is connected to the U-phase winding via a second line L5. A node Vw between the third switching element Q3 and the sixth switching element Q6 is connected to the W-phase winding via a third line L6. Switching operations of the first to the sixth switching elements Q1 to Q6 are respectively controlled by control signals H1 to H6 from the microcomputer 140.

The first line L4 has a first auxiliary switch 152 which can be turned on or off. The first auxiliary switch is a mechanical switch, and electrically connects the node Vu to the U-phase winding when turned on. When turned off, the first auxiliary switch 152 electrically connects the U-phase winding to the V-phase winding via a resistor R20.

The third line L6 has a second auxiliary switch 153 which can be turned on or off. The second auxiliary switch is a mechanical switch, and electrically connects the node Vw to the W-phase winding when turned on. When turned off, the second auxiliary switch 153 electrically connects the W-phase winding to the V-phase winding via a resistor R21.

The first auxiliary switch 152 and the second auxiliary switch 153 are configured to be turned on or off in an interlocking manner with the trigger switch 151 when the trigger switch 151 is turned on or off by an operator. That is, when the trigger switch 151 is turned on by the operator, the first auxiliary switch 152 and the second auxiliary switch 153 are also turned on. In contrast, when the trigger switch 151 is turned off by the operator, the first auxiliary switch 152 and the second auxiliary switch 153 are also turned off. The first auxiliary switch 152 and the second auxiliary switch 153 may be turned on or off simultaneously as the trigger switch 151 is turned on or off. The trigger switch 151, the first auxiliary switch 152, and the second auxiliary switch 153 are one example of the switch.

The microcomputer 140 can operate with the electric power supplied from a switching power supply circuit 141. When the trigger switch 151 is turned on, the switching power supply circuit 141 is connected to the power supply PS to be operable. The microcomputer 140 controls the switching operation of the inverter circuit 120 in accordance with output signals from hall effect elements 142 provided at the brushless motor 130 to control the rotation of the brushless motor 130. The microcomputer 140 is one example of the controller.

In the present embodiment, the trigger switch 151, the first auxiliary switch 152, the second auxiliary switch 153, and the stator 132 are one example of the first braking means. The microcomputer 140 and the stator 132 are one example of the second braking means.

Next, an operation of the circuit illustrated in FIG. 5 will be described.

When the alternating-current power is supplied from the alternating-current power supply PS, electric power is supplied from the switching power supply circuit 141 to the microcomputer 140.

When the trigger switch 151 is turned on by an operator, the inverter circuit 120 is supplied with electric power to start a switching operation in accordance with control signals from the microcomputer 140. At this time, because the first auxiliary switch 152 and the second auxiliary switch 153 are also turned on, the nodes Vu, Vv, and Vw in the inverter circuit 120 are respectively connected to the corresponding U-phase, V-phase, and W-phase windings in response to the switching operations of the first to the sixth switching elements Q1 to Q6. Accordingly, the brushless motor 130 is started.

The microcomputer 140 detects the number of rotations of the rotor 131 depending on output signals from the hall effect elements 142, and controls the switching operation of the inverter circuit 120 in order to maintain the number of rotations of the rotor 131 a predetermined number (Step S12).

In the normal operation, when one operation is finished, an operator turns off the trigger switch 151 to stop power feeding to the inverter circuit 120 and the microcomputer 140. When the trigger switch 151 is turned off, the first auxiliary switch 152 and the second auxiliary switch 153 are also turned off. As a result, the U-phase winding is electrically connected to the V-phase winding via the resistor R20, and the W-phase winding is electrically connected to the V-phase winding via the resistor R21. Thus, the U-phase, V-phase, and W-phase windings are connected with each other in the stator 132, and there is formed a closed circuit including the windings, the trigger switch 151 (the OFF contact) which is in the OFF state, and the resistors R20 and R21. The closed circuit formed at this time is one example of the first closed circuit of the present invention. Because the rotor 131 continues to rotate when the trigger switch 151 is turned off, current flows in the first closed circuit due to the change in magnetic flux caused by the rotation of the rotor 131 including a permanent magnet. The current which flows in the first closed circuit, that is, in the windings of the stator 132, consumes electric power, exerting braking force on the rotation of the rotor 131. A series of flow of operations performed from when the trigger switch 151 is turned off until when the braking force is exerted on the rotor 131 is one example of the first braking means of the present invention.

Figure 6:
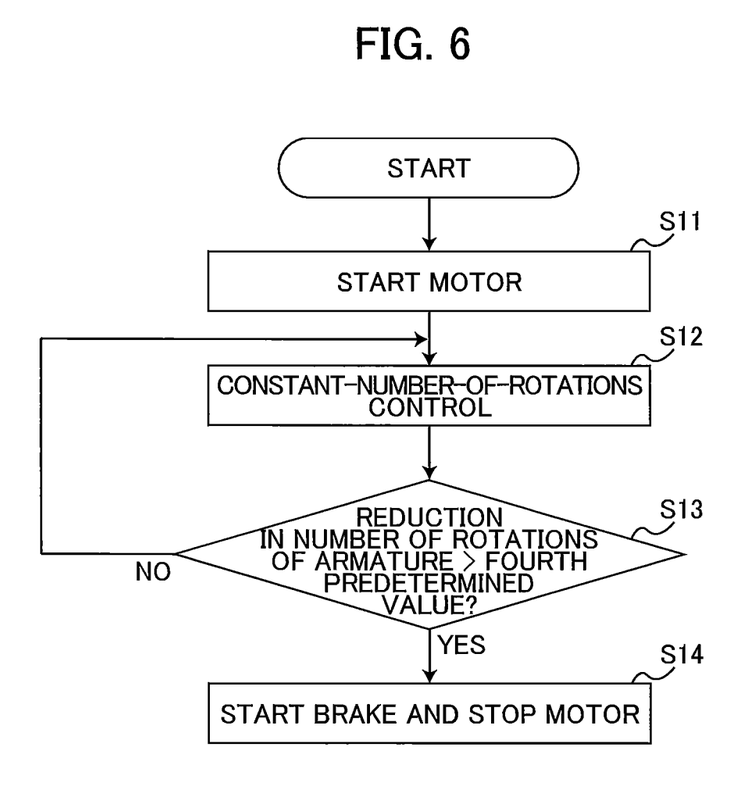
FIG. 6 A flowchart illustrating an operation of the power tool shown in FIG. 5.

Next, the braking performed when the trigger switch 151 is in the ON state will be described with reference to FIG. 6.

When an operator turns on the trigger switch 151, the brushless motor 130 is started by control signals from the microcomputer 140 in the similar manner to that of the normal operation (Step S11). The microcomputer 140 controls the switching operation of the inverter circuit 120 so that the rotor 131 keeps a predetermined number of rotations (Step S12). The microcomputer 140 then compares the amount of reduction per unit time of the number of rotations of the rotor with a fourth predetermined value; and thereby determines whether kickback has occurred (Step S13). The fourth predetermined value is a value corresponding to a change in the number of rotations of the rotor 131 only when kickback has occurred. Thus, the fourth predetermined value is not exceeded in normal operations.

In Step S13, if the amount of reduction per unit time of the number of rotations of the rotor 131 is larger than the fourth predetermined value, then the microcomputer 140 determines that kickback has occurred or may occur (Step S13: YES). Then, in Step S14, the microcomputer 140 sends control signals to the inverter circuit 120 to turn off all of the first to the third switching elements Q1 to Q3 disposed on the high-potential line side, and one of the fourth to the sixth switching elements Q4 to Q6 disposed on the low-potential line side. For example, the sixth switching element Q6 is turned off, and the fourth and the fifth switching elements Q4 and Q5 are turned on. At this time, there is formed a closed circuit (second closed circuit) including the low-potential line L2, the fourth switching element Q4, the trigger switch 151 (the ON contact) which is in the ON state, the U-phase winding and the V-phase winding of the stator 132, and the fifth switching element Q5. This closed circuit consumes electric power generated by the rotation of the rotor 131 (by transforming the electric power to heat), and thereby brakes the rotation of the rotor 131 (Step S14). The braking force generated at this time can be changed by turning on and off the fourth switching element Q4 by using a PWM signal from the microcomputer 140, and thus by changing the duty ratio of the ON time. As the duty ratio of the ON time is increased, the duration in which the regeneration current flows is increased. Thus, the braking force is increased, and the brushless motor 130 can be stopped more quickly.

The detection of kickback in Step S13 may be performed on the basis of the acceleration of the power tool 2 detected by an acceleration sensor provided on the housing 10 in addition to compare the amount of reduction per unit time of the number of rotations of the rotor with the fourth predetermined value. In addition, a current detection circuit may be provided on the low-potential line L2. Overload or overcurrent to the brushless motor 130 may be determined, based on the detected motor current. As a result, the rotation of the rotor 131 may be braked, thereby stopping the power tool 2.

In the present embodiment, the first auxiliary switch 152 and the second auxiliary switch 153 are turned off in the interlocking manner with the trigger switch 151 when the trigger switch 151 is turned off. At this time, the U-phase winding and the W-phase winding of the stator 132, and the resistors R20 and R21 are connected in series with each other to form a closed circuit. When the trigger switch 151 is turned off, the motor current flows in the closed circuit. The motor current gradually decreases because the resistors R20 and R21 consume the electric power. Thus, when the trigger switch 151 is manually turned off by an operator, the closed circuit operates as a soft brake to the brushless motor 130, preventing hard braking to the brushless motor 130.

In this manner, when kickback occurs, even if an operator cannot turn off the trigger switch 151 and the trigger switch 151 is in the ON state, the rotation of the brushless motor 130 can be reliably and quickly braked by disconnecting the brushless motor 130 from the power supply PS and by causing the resistors R20 and R21 to rapidly consume the current which flows in the stator 132. Thus, the power tool 2 can be stopped In addition to kickback, also when the microcomputer 140 detects overcurrent to the motor or falling of the housing 100, the microcomputer 140 can brake the rotation of the brushless motor 130 and stop the power tool even if the trigger switch cannot not be turned off. That is, when a change in condition of the power tool (such as the number of rotations, current value, or position) equal to or larger than a predetermined change is detected, the motor can be quickly braked.

REFERENCE SIGNS LIST

PS . . . power supply, 1, 2 . . . power tool, 10, 100 . . . housing, 11, 101 . . . driving circuit, 12, 151 . . . switch, 20 . . . brushed motor, 23 . . . brake coil, 37 . . . brake control circuit, 38, 140 . . . microcomputer, 120 . . . inverter circuit, 130 . . . brushless motor

The invention claimed is:

1. A power tool comprising:
   a motor accommodated in a housing, the motor rotating with electric power supplied from a power source;
   a control circuit configured to control rotation of the motor;
   a switch configured to be manually switched between on and off of power supply from the power source to the motor;
   a first braking part configured to brake the motor when the switch is switched from on to off; and
   a second braking part configured to brake the motor on the basis of a predetermined signal from the control circuit when the switch is in an on state, wherein
   the first braking part comprises a first closed circuit formed when the switch is switched,
   the second braking part comprises a second closed circuit generated by the control circuit, and
   the first closed circuit and the second closed circuit are provided at the control circuit.

2. The power tool according to claim 1, wherein the second braking part stops the power supply from the power source to the motor.

3. The power tool according to claim 1, wherein the predetermined signal is a signal generated by the control circuit when the control circuit detects a change more than a prescription related to the motor.

4. The power tool according to claim 3, wherein the change more than the prescription is at least one of number-of-rotations, a current value, and a position.

5. The power tool according to claim 1, wherein
the control circuit is configured to maintain at least one of the first closed circuit and the second closed circuit at braking.

6. The power tool according to claim 5, wherein the second closed circuit comprises a switching element to be switched on by means of the predetermined signal.

7. The power tool according to claim 5, wherein the first closed circuit comprises a brake coil, and the first closed circuit is configured to brake the motor.

8. The power tool according to claim 7, wherein the second braking part uses the brake coil of the first braking part to brake the motor.

9. The power tool according to claim 1, wherein the motor is a brushed motor.

10. The power tool according to claim 1, wherein the motor is a brushless motor.

* * * * *